United States Patent [19]

Matsuura

[11] Patent Number: 4,592,053

[45] Date of Patent: May 27, 1986

[54] PROGRAMMABLE CONTROLLER

[75] Inventor: Toshimi Matsuura, Nagaokakyo, Japan

[73] Assignee: Omron Tateisi Electronics Co., Kyoto, Japan

[21] Appl. No.: 467,377

[22] Filed: Feb. 17, 1983

[30] Foreign Application Priority Data

| Feb. 19, 1982 | [JP] | Japan | 57-25727 |
| Feb. 24, 1982 | [JP] | Japan | 57-28571 |
| Mar. 17, 1982 | [JP] | Japan | 57-42337 |
| Mar. 24, 1982 | [JP] | Japan | 57-47027 |

[51] Int. Cl.⁴ .............................. G06F 11/32
[52] U.S. Cl. ........................ 371/29; 364/184; 364/200; 371/16
[58] Field of Search ............. 371/16, 20, 29; 364/140, 184, 186, 200, 900

[56] References Cited

U.S. PATENT DOCUMENTS

| 3,829,842 | 8/1974 | Langdon et al. | 364/900 |
| 4,062,061 | 12/1977 | Batchelor et al. | 364/900 |
| 4,133,477 | 1/1979 | Marino et al. | 371/20 |

Primary Examiner—Charles E. Atkinson
Attorney, Agent, or Firm—Cushman, Darby & Cushman

[57] ABSTRACT

While a user program is being executed, an abnormality detection program instruction which is part of the user program is executed, and in accordance with the result of logical operation between input and output data specified in the abnormality detection program, plural abnormality flags are set or reset respectively. As a result of this, all of the abnormality flags which are set are detected. And it is made possible to display all abnormality information corresponding to those detected abnormality flags.

6 Claims, 22 Drawing Figures

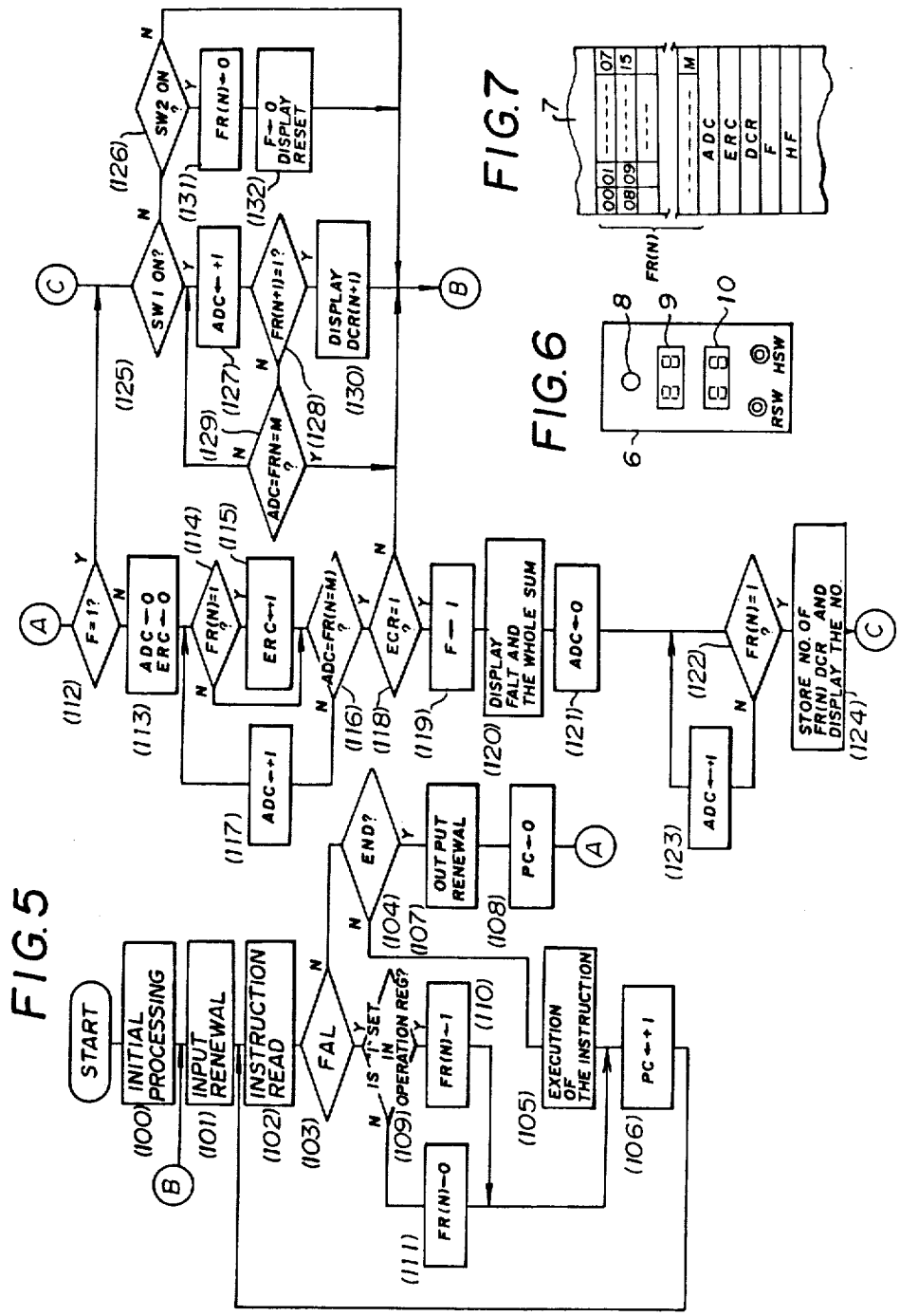

FIG. 12
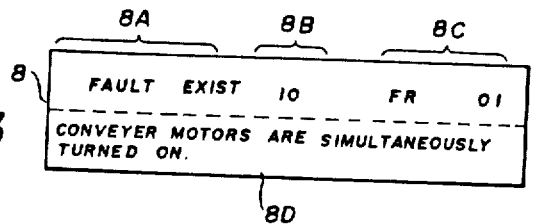
FIG. 13
FIG. 14
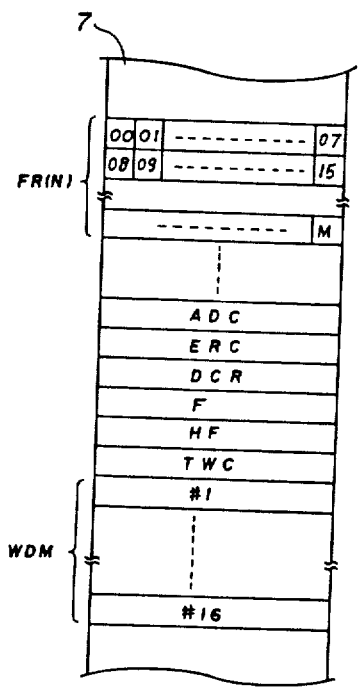

PROGRAMMABLE CONTROLLER

BACKGROUND OF THE INVENTION

The present invention relates to a programmable controller which performs sequence control of a system, more particularly it relates to a control technique for displaying plural abnormalities occurring in a system to be controlled.

As is well known, a programmable controller is composed so that the sequence control of a system can be realized by repeatedly executing in sequence a group of instructions stored in a user's program memory.

As a system for which sequence control is to be applied, a conveyor system, for example, is now considered. In this system, articles are placed on a conveyer belt and they are transported from one side to the other side and vice versa. The control operation of a programmable controller to be applied to such a system can be summarized as follows. Namely, the controller upon receipt of detection signals from detectors, which detect articles on the conveyer belt, generates instruction signals whereby plural motors which drive the conveyor belt are caused to perform such operations as start, stop, normal rotation and reverse rotation, etc. in a fixed sequence. The instruction signals are generated as a result of logical operation of input condition and output conditions (these conditions are referred to as input/output data). Also, within the conveyer motors, there is a group of motors wherein the movements are performed simultaneously and another group of motors wherein the movements are not performed simultaneously. In any case, when an instruction signal which directs a movement contrary to the classfication of the group within which the motor is located is generated, an abnormality of the system is brought about. This means that a logical abnormality has occurred in a stage of logical operation at the side of the programmable controller.

Conventional programmable controllers have been designed to optionally set an abnormality detection program in the user's program memory as part of a user program so that an abnormality of a system to be controlled can be detected by the user program and the abnormality thus detected can be acknowledged. In other words, it is conventionally arranged as follows. When detecting the logical abnormality by the execution of an instruction of the abnormality detection program, the machine number of the input/output device (for example, is issued as abnormality information.

However, in the case of a conventional programmable controller, if plural abnormalities are detected in a stage of the execution of a user program, said abnormality information to be issued is such that it corresponds to only one of the plural abnormalities. Moreover, the controller has been designed so that such abnormality information cannot be reset unless the cause of the abnormality is eliminated.

In other words, in a conventional programmable controller, when plural abnormalities occur at the same time, the user of the controller is forced to use a troublesome abnormality recovering process, as described below. First of all, the user stops the controller and performs a recovery process to remove the cause of the abnormality, thereby putting the device back into operative condition. Then, the next abnormality information is presented and in this stage the user notices that another abnormality has occurred. Thereupon, the user begins to remove the cause of the next abnormality. In this way, the user must repeat operations in order to eliminate all the causes of plural abnormalities.

As is well known, for those abnormalities which occur at the same time in a system, some are caused by completely independent causes, while others are related to each other and thus one abnormality induces other abnormalities in many cases. For example, in the above mentioned conveyer system, if an abnormality occurs in a detector, it could cause the issue of an instruction signal which causes a conveyer motor to abnormally operate. In this case, the trouble can be easily solved by simply recovering the faulty detector. In such a case, a program exists such that only one abnormality information is issued, and moreover it is unknown which one of a detector abnormality and that of a conveyor motor abnormality is presented first, due to the properties of the programmable controller. When the abnormality of the conveyer motor is presented earlier, the user is forced to carry out the aforementioned troublesome recovery processing.

As a countermeasure for such troublesome processing, a method whereby all abnormalities which occurred are displayed for the judgement of a user may be considered. However, this idea would not be practical since it would require a large and expensive device.

BRIEF SUMMARY OF THE INVENTION

The present invention has been made in view of the conventional problems described hereinafter and the object of the present invention is to provide a programmable controller which is capable of informing its user of all abnormalities which have occurred, by means of a small scale display unit when plural abnormalities have occurred at the same time, in a system to be controlled, and they are detected by plural abnormality detection program. By this, the user is able to grasp the details of all abnormalities which have occurred, in a system to be controlled, and take rapidly appropriate actions for recovering abnormalities.

Another object of the present invention is to provide a programmable controller which is capable of displaying identification numbers of plural abnormalities, detected by abnormality detection programs, on a small scale display unit one by one in sequence in response to the manual operation of a display renewal switch.

Another object of this invention is to provide a programmable controller which is capable of displaying a total number of abnormalities detected by abnormality detection programs.

Another object of this invention is to provide a programmable controller which is capable of automatically displaying identification numbers of plural abnormalities, detected by abnormality detection programs, on a small scale display unit one by one in sequence at a fixed cycle.

Another object of this invention is to provide a programmable controller which is structured so that when the execution of an abnormality detection program judges an abnormality, it is able to display the abnormalities together with the logical conditions of input/output data used in an execution stage of the abnormality detection program. By this, it can be known in detail by what causal relation the abnormality detected by the abnormality detection program has occurred.

Another object of this invention is to provide a programmable controller which is structured so that when the plural abnormalities are detected by abnormality detection programs, it is able to display the kind, content or a measure to be taken for each of the detected abnormalities in the form of a message established in advance by the user. By this arrangement, the operator, even if he is not skilled in the art yet, is able to easily take necessary actions for recovering from abnormalities.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 5 is a flowchart showing primarily the display control movements of the first embodiment of said programmable controller.

FIG. 6 is a schematic diagram showing the configuration of the operating unit second embodiment of the present invention.

FIG. 7 is a schematic diagram showing flags, etc. of the second embodiment to be provided in a working memory.

FIG. 8(a) shows abnormality detection movements in the stage of a cyclical execution of a user program and FIG. 8(b) shows display control movements wherein each number of an abnormality flag is automatically renewed by a periodical interrupt and they are repeatedly displayed respectively.

FIG. 12 is a schematic diagram showing the key arrangement of a keyboard.

FIG. 13 is a schematic diagram showing the display pattern of a display unit.

FIG. 14 is a schematic diagram showing flags, etc. of the fourth embodiment of the present invention to be provided in a working memory.

FIGS. 15(a) and (b) are flowcharts showing the outline of display control movements of said programmable controller of the fourth embodiment of the present invention and more specifically FIG. 15(a) shows abnormality detection movements in the course of a cyclical execution of a user program and FIG. 15(b) shows display control movements wherein each number of an abnormality flag and the message corresponding thereto are automatically renewed by periodical interrupts and they are repeatedly displayed respectively.

DETAILED DESCRIPTION OF THE INVENTION

Figure 1:
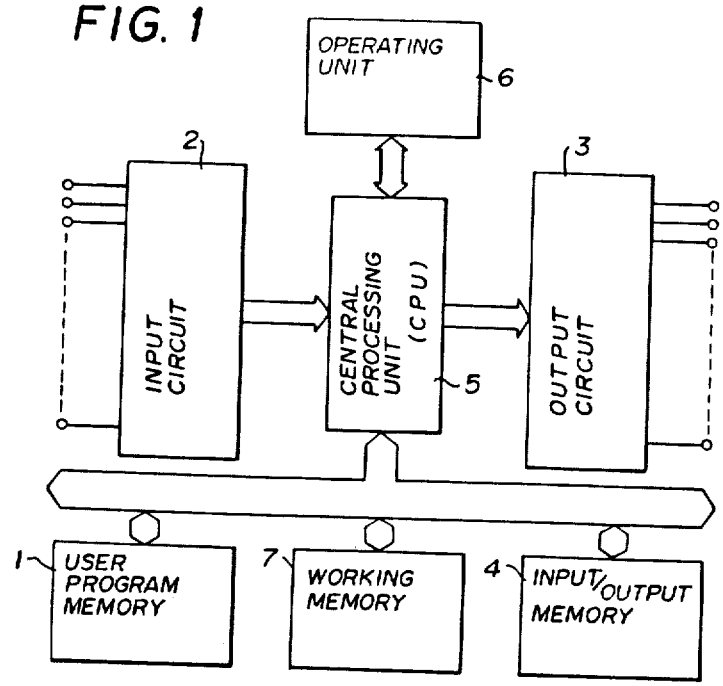
FIG. 1 is a block diagram indicating, in block form, the configuration of the programmable controller of the present invention.

FIG. 1 is a block diagram showing the configuration of a programmable controller of the present invention. This programmable controller is basically equipped with a user program memory 1 wherein user programs including abnormality detection programs are stored; an input circuit 2 to which external input signals are given; an output circuit 3 which sends out external output signals; an input/output memory 4 which becomes a buffer memory of input/output data corresponding to said input circuit 2 and said output circuit 3; an instruction execution means wherein by each instruction of said user program memory 1 is executed in sequence at a high speed, operational processing is carried out based on the data of said input/output memory 4, and based on the result of the processing, the output data of said input/output memory 4 are rewritten; an input renewal means which writes down the input data of said input circuit 2 in a specified area of said input/output memory 4 and an output renewal means which sets the output data of the specified area of said input/output memory 4 in said output circuit 3. Said instruction execution means, input renewal means and output renewal means are realized by a CPU (central processing unit) 5 composed of so-called microprocessors. The CPU 5 performs control movements as an instruction execution means and an input/output renewal means and also performs various kinds of processing to be described later for causing an operating unit 6 to perform abnormality display control movements of all of the embodiments of the present invention to be described hereinafter. At that time, a memory 7 which is a RAM is used as a working memory.

The output instruction of said abnormality detection programs optionally set in said user program memory 1 as part of user programs is distinguished by mnemonic code FAL of the operation code unit. It is also arranged so that the number of an abnormality flag FR (N) is designated by its operand unit. This abnormality flag is individually set or reset based on the result of optional logical operations between optional input/output data by the execution of said FAL instruction while said instruction execution means is in operation. At that same time, it is arranged so that this abnormality flag can be optionally used as the input data of logical operation in the user program. This will be described in detail according to FIG. 2.

Figure 2:
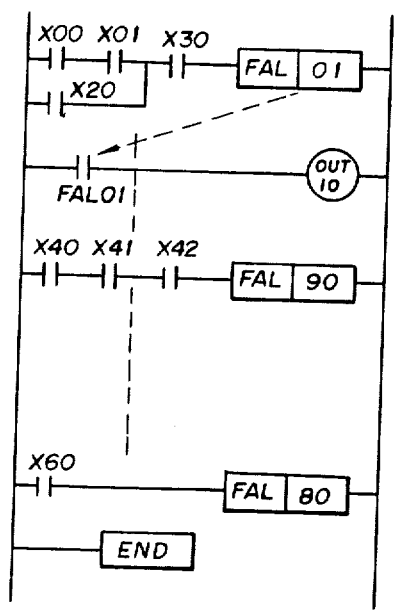
FIG. 2 is a schematic diagram of an example of the abnormality detection program of the present invention represented in the form of a relay ladder diagram.

FIG. 2 is a schematic diagram of an example of said abnormality detection programs represented in the form of a relay ladder diagram.

The portion A in the figure shows that input/output data of FAL 01 are formed by the logical conditions of "open formed" and "close formed" of contact point symbols X00, X01, X02 and X30. Each contact point symbol corresponds to an input/output device which is the subject of controlling. That is, user instructions (instructions of the user program) of LDX00, ANDX01, LDX20, ORLD and ANDX30 are executed in sequence. The results of the logical operation which is the result of the execution of the instructions are stored in an operation register. Next, when FAL01 is read out, the contents of the operation register are checked. In other words, if "1" is set in the operation register, FR(01) is set as a logical abnormality. Consequently, conditions whereby FR(01) is set are such that when X00, X01 and X30 are all close formed or when X20 and X30 are close formed.

Also the portion B in the figure shows that the result of execution of FAL(01) becomes input conditions of OUT 10 which is the output instruction of the user program. By this, for example, a buzzer is driven. Like this, an abnormality detection program is properly incorporated into a user program.

Figure 3:
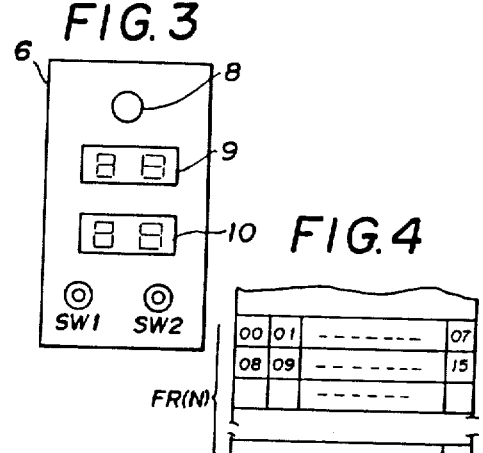
FIG. 3 is a schematic diagram indicating the configuration of the operating unit first embodiment of the present invention.
Figure 4:
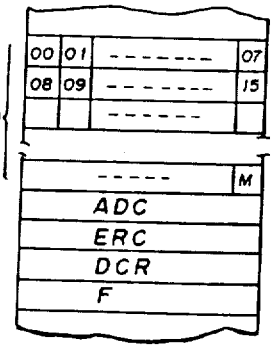
FIG. 4 is a schematic diagram indicating flags, etc. of the first embodiment to be provided in a working memory.

For the aforementioned basic configuration, the programmable controller of each embodiment (1-5 embodiments) to be explained hereinafter is composed as follows:

FIGS. 3 through 5 show the programmable controller of the first embodiment.

In FIG. 3, the operating unit 6 of the first embodiment is equipped with a fault display lamp 8 for informing the occurrence of an abnormality, a number display device 9 for displaying the number of occurrence of the fault, an identification number display device 10 for displaying the identification number of a subject of control, an advance switch SW 1 for advancing the number display on the number display device 10 and a reset switch SW 2 for resetting the display of said devices 8, 9, 10 and initializing said apparatus.

In FIG. 4, said working memory 7 is equipped with said abnormality flag FR(N), address counter ADC which detects a flag which is in the condition of FR(N)=1 by addressing said abnormality flag FR(N) up to N=0~M every time when a cycle of said user program is executed by said instruction execution means, a fault display flag F which is set to cause the lamp 8 to light when a flag which is in the condition of FR(N)=1 is detected as a result of said addressing, and is reset by the operation of said reset switch SW 2, an error counter ERC which detects a total number of detected flags which are in the condition of FR(N)=1 as a result of said addressing and causes said number display device 9 to display the detected number, and a display control register DCR which stores the number of an abnormality flag FR(N) detected first as a result of said addressing and causes said number display device 10 to display the number, addresses and stores such a flag that is in the condition of FR(N)=1 every time when advance operation is performed by said advance switch SW 1 and causes said number display device 10 to display numbers of abnormality flags FR(N) from the smallest number to the largest in sequence.

FIG. 5 is a flowchart showing primarily the portion of the first embodiment of a system program to be executed by CPU 5, and the control movements of CPU 5 will be described below in accordance with the flowchart.

In the beginning, the basic movements of a programmable controller which is commonly applied to all embodiments are explained (step 100~step 111).

In the first step 100, the power supply circuit is closed and various kinds of initial processing which are well known are performed. By this operation, the display of the operating unit 6, various flags and counters, etc. in the working memory 7 are reset.

In step 101, external input signals given to the input circuit 2 are written down in the specified area of the input/output memory 4 (input renewal means).

Steps 102, 103, 104, 105 and 106 are those operations of CPU 5 which execute a user program stored in the user program memory 1 from a top address to an end instruction at a high speed. When an END instruction is detected (104), in step 107, the output data of the input/output memory 4 is rewritten in accordance with the result of execution of each instruction (movement of the output renewal means). In the next step 108, the program counter PC is initialized. The above steps represent a cycle of the execution of a user program which is well known.

If said FAL instruction is detected in step 103 which is midway through the execution cycle of the user program, each routine of step 109, 110 and 111 is executed. In this routine, as aforementioned an abnormality flag FR(N) designated by the operand of the FAL instruction is set or reset depending on whether "1" is set in the operation register not as a result of execution of each instruction before the FAL instruction.

As stated above, while an execution cycle of a user program is being performed, said processing is carried out for all of the abnormality flags FR(N) (N=M).

Next, the abnormality display control movements of the first embodiment are carried out as follows:

If the result of judgement by step 112 is NO, each routine of step 113 and the following steps are executed. In other words, all pieces (N=M) of abnormality flags FR(N) are addressed by the address counter ADC. As a result of this, when flags which are in the condition of FR(N)=1 are detected, the number of flags is counted by the error counter ERC and a fault display flag F is set. The set fault display flag causes the fault display lamp 8 to light and also causes the number display device 9 to display the value counted by the error counter ERC. Next, the address counter ADC detects a flag of the smallest number among those set abnormality flags FR(N) and stores it in the display control register DCR and displays the number on the number display device 10.

If the result of judgement by step 112 is YES, in step 125 or step 126, the operation of the advance switch SW 1 or the reset switch SW 2 is detected. When these switches SW 1 and SW 2 are not operated, said programmable controller normally operates to execute user programs and displayed contents of the operating unit 6 are retained as they are.

When the operation of the advance switch SW 1 is detected by step 125, each routine of step 127 and the following steps are executed. In other words, a number which is larger by one stage than the number of an abnormality flag FR(N) displayed on the number display device 10 is detected and it is displayed on the number display device 10. By this operation, the number of an abnormality flag FR(N) is displayed in sequence from the smallest to largest on the number display device 10 for every operation of the advance switch SW 1.

Also in step 126, the operation of the reset switch SW 2 is detected, each display of an abnormality flag FR(N), fault display flag F and the operating unit 6 is reset by steps 131 and 132.

As explained in detail hereinafter, the programmable controller of the first embodiment is capable of easily displaying the occurrence of an abnormality, the number of abnormalities and the individual numbers of subject of control without making the size of the device larger by such an arrangement, wherein the number of set flags among abnormality flags is detected every time one cycle of the user program is executed, the detected number is displayed and all numbers of set flags among said abnormality flags are displayed on one display device and they are renewed by the operation of a switch. Therefore, the user is able to know in advance the contents of all abnormalities. As a result, the user is able to make a proper judgement and take necessary actions according to the kind of abnormality and the condition of a subject of control.

Figure 8A:
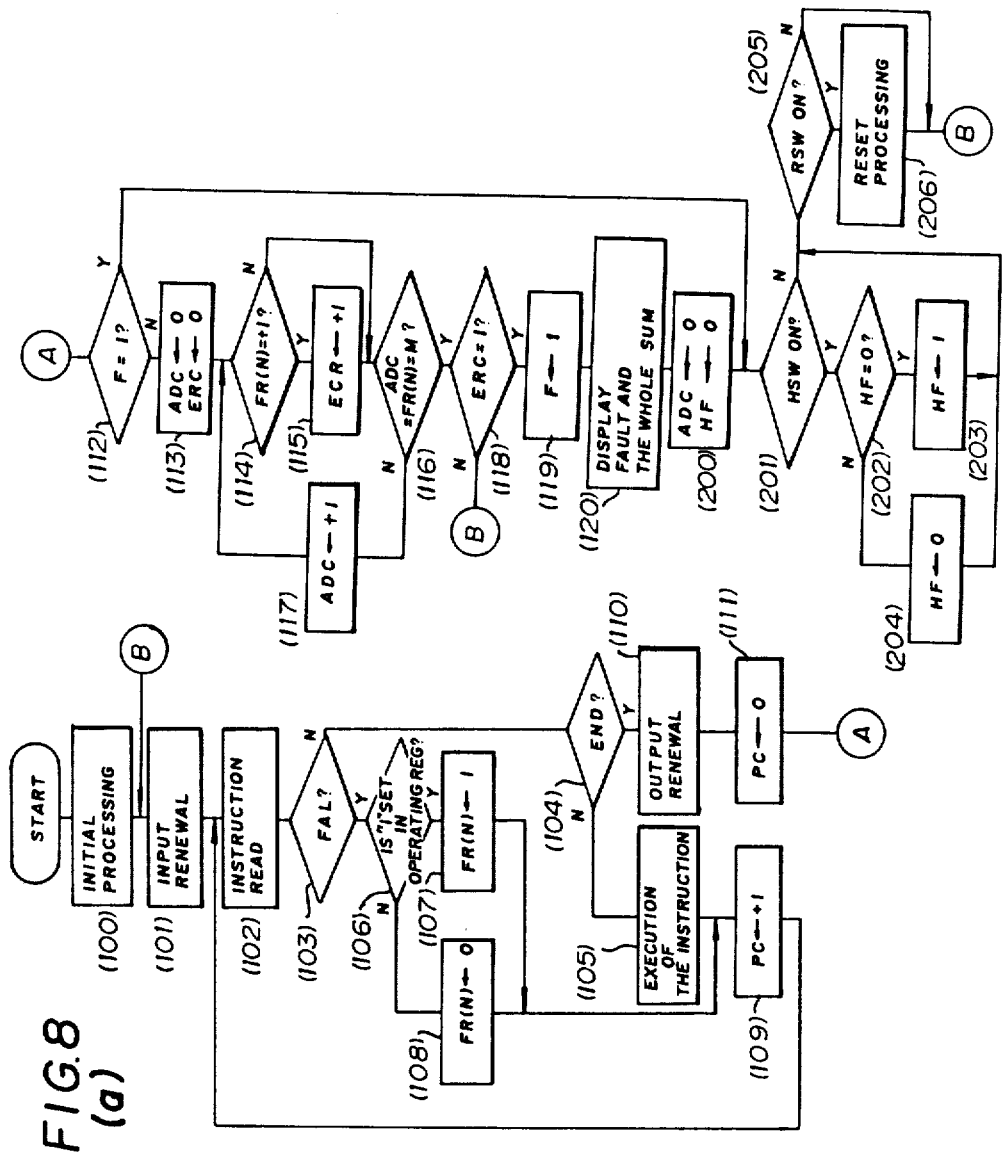
FIGS. 8(a) and (b) are flowcharts showing primarily the portion of the second embodiment of those control movements of said programmable controller and more specifically
Figure 8:
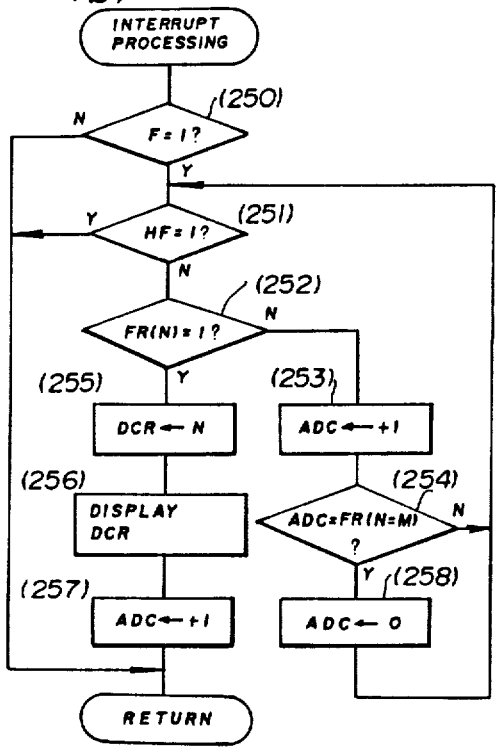

Next, FIG. 6 through FIG. 8 show the programmable controller of the second embodiment of the present invention. Since the basic configuration of said controller is the same as FIG. 1, the showing of its schematic diagram is omitted and the same symbols are given to those parts of the same name and their explanations are omitted herein.

FIG. 6 is a schematic diagram showing the configuration of the operating unit 6 of the second embodiment. This operating unit 6 is equipped with a fault display lamp 8 which functions in the same manner as the first embodiment, a number of piece display devices 9, a number display device 10, which automatically and repeatedly display identification numbers of subjects of control which present abnormal conditions in sequence at a fixed interval, a hold switch HSW which causes the number display device 10 to continuously display a specific number by stopping its repeated display and a reset switch RSW which functions in the same manner as the switch SW 2.

In FIG. 7, the working member 7 is further equipped with, in addition to the aforementioned configuration, a hold flag HF which operates reversely every time said hold switch HSW is operated and controls said number display device 10 whether it is caused to automatically and repeatedly display numbers at a fixed interval or it is caused to continuously display a specific number by stopping its repeated display.

FIGS. 8(a) and (b) are flowcharts showing the portions of the second embodiment of a system program to be executed by CPU 5, and FIG. 8(a) shows abnormality detection movements in the course of execution of a cycle of a user program, and FIG. 8(b) shows display control movements whereby the number N of each abnormality flag FR(N) is automatically renewed by periodical interrupts and such a number is repeatedly displayed on the number display device 10 respectively. The control movements of CPU 5 will be described below in accordance with FIGS. 8(a) and (b).

In FIG. 8(a), following the aforementioned basic movements, the routines of step 200 and the following steps are executed.

In step 200, the address counter ADC and the hold flag HF are reset in preparation for the operation of a switch by an operator in step 201. If the result of judgement of step 112 is YES, processing is advanced to step 201 in the same manner.

Step 201 is a routine which detects whether the hold switch HSW is operated or not. As the hold switch HSW is operated, the condition of the hold flag HF is checked by step 202. If the hold flag HF is reset, it is set by step 203. If the hold flag HF is set, it is reset by step 204. In other words, every time the operation of the hold switch HSW is detected by step 201, the hold flag HF is caused to operate reversely.

The next step 205 is a routine which judges whether the reset switch RSW is operated or not. If the result of judgement is YES, processing advances to the next step 206, and said various flags are reset and it returns to step 101.

In FIG. 8(b), upon receipt of one of the periodical interrupts, the CPU 5 judges whether the fault display flag is set or not in step 250. If the result of judgement is NO, the subject of control of said device is normal, therefore the CPU 5 returns the program to the point prior to the acceptance of the interrupt. If the result of judgement is YES, the condition of the hold flag HF is checked by step 251. As a result, if the hold flag HF is reset, the routines of step 252, 253, 254, 251 and 252 are executed. By this, the smallest number of those abnormality flags which are in the condition of FR(N)=1 are detected. In step 255, the detected number N is set in the display control register DCR. Then, the number N is displayed on the number display device 10 by step 256. In step 257, the address counter ADC is advanced in preparation for the next interrupt.

Next, when the CPU 5 accepts the next interrupt, it advances to step 251 through step 250. As a result, if the hold flag HF is set, the CPU 5 returns to the program before the acceptance of the interrupt without renewing the preceding number displayed on the number display device 10.

If the hold flag HF is reset, as aforementioned, the routines of step 252, 253, 254, 251 and 252 are executed. That is, the serial number of a flag which is in the condition of FR(N)=1 to be displayed next on the number display device 10 is detected, and the detected number is displayed on the number display device 10 by the routines of step 255 and 256. When a total number of abnormality flags which are in the condition of FR(N)=1 are detected by step 254, the address counter ADC is reset by step 258 and the CPU 5 returns to step 251.

As stated hereinafter, every time the CPU 5 accepts a periodical interrupt, a number displayed on the number display device 10 is automatically and sequentially renewed to the next number, from the smallest to the largest one in sequence, at a fixed interval and this is repeated. Also, by the operation of the hold switch HSW, the automatic updating of the numbers to be displayed on the number display device 10 is stopped and the same number is continuously displayed.

As explained above in detail in the foregoing, according to the second embodiment, it is possible to repeatedly and automatically display the serial numbers of detected abnormality flags at a fixed interval, therefore, it is also possible to cause a display device to simply and automatically update and display an individual number of a subject of control wherein abnormality occurs, or to continuously display the same number as necessary.

Figure 9:
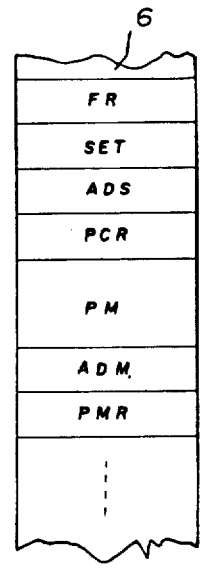
FIG. 9 is a schematic diagram showing flags, etc. of the third embodiment of the present invention to be provided in a working memory.
Figure 10:
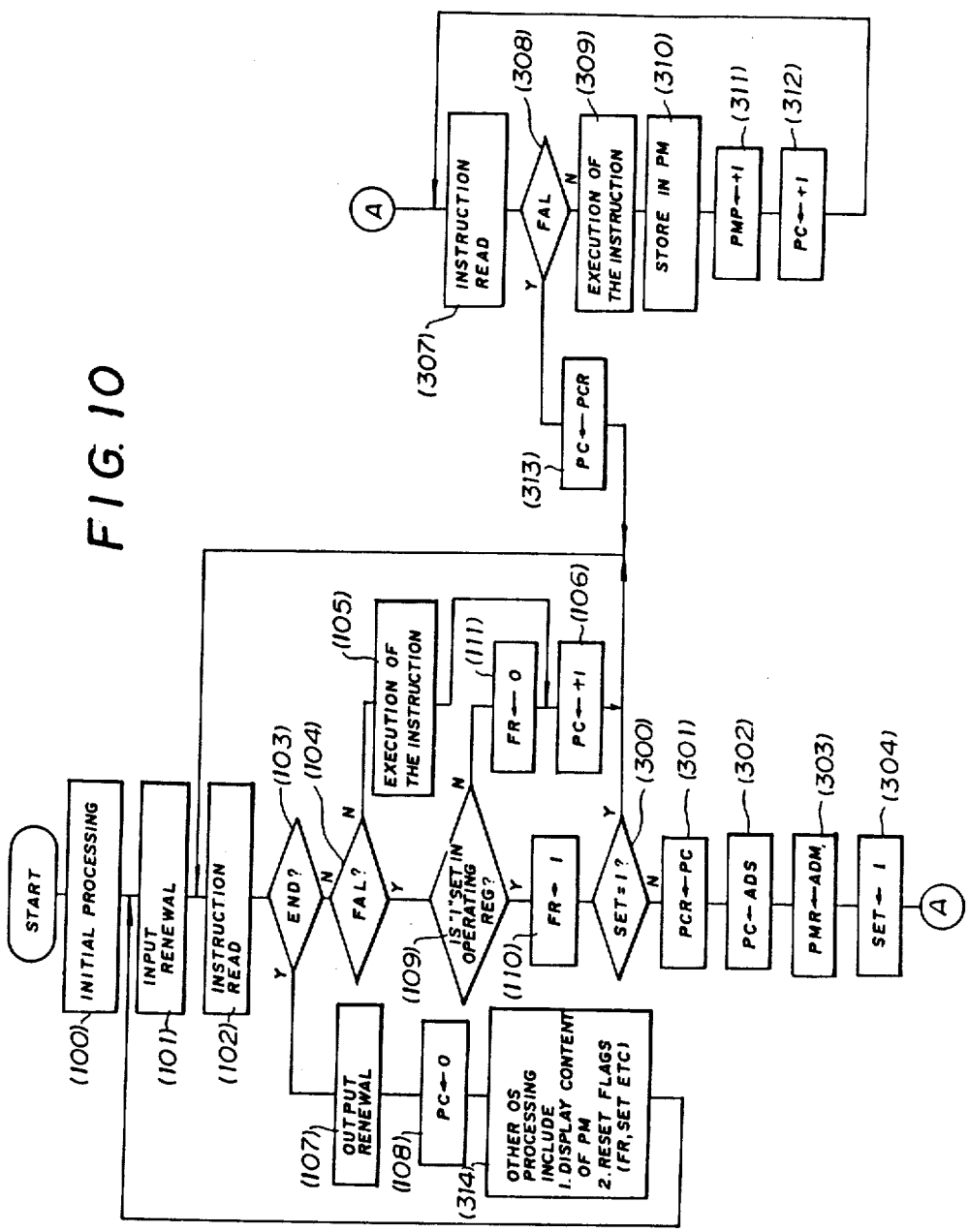
FIG. 10 is a flowchart showing primarily the display control movements of the the third embodiment of programmable controller.

Next, FIG. 9 and FIG. 10 show the programmable controller of the third embodiment of the present invention. Since the basic configuration of the third controller is the same as shown in FIG. 1, the showing of its schematic diagram is omitted and the same symbols are given to those parts of the same name and their explanations are omitted herein.

In FIG. 9, the working memory 7 is equipped with an abnormality flag FR, a program counter register PCR which temprarily stores the contents of a program counter PC (not shown) for the purpose of preserving the condition of a user program which is being cyclically executed when said abnormality flag FR is set, a start address register ADS which stores the first address of an operation instruction for said input/output data of said abnormality detection program, sets the first address in the program counter PC when said abnormality flag FR is set and reexecutes the logical operation of said input/output data (in other words, the address of a load instruction of LDX00 stored in the user program memory 1 is set in this start address register), a pattern memory PM which completely memorizes the results of execution of logical operation between said input/output data together with status information, a pattern memory address ADM which designates a start address when said result of execution is memorized in the pattern memory PM, a pattern memory address register PMR which stores the pattern memory address ADM when said abnormality flag FR is set and advances the address of the pattern memory PM and a flag set which indicates that the result of execution of relogical operation between said input/output data is memorized in said pattern memory PM.

In this embodiment, for the purpose of simplifying the following explanation only one abnormality flag FR to be designated by the operand of a FAL instruction is used, and it is assumed that fixed addresses are set in the start address register ADS and the pattern memory address ADM.

Next, the outline of control movements of the CPU 5 of third embodiment will be described in accordance with the flowchart shown in FIG. 10.

In this embodiment, in addition to the aforementioned basic movements, the routines of step 300 and the following steps are executed.

Step 300 is a routine which judges whether data are written in the pattern memory PM or not. If the result of judgement is NO, the contents of the program counter PC are temporarily stored in the program counter register PCR by step 301, and the routine stops and preserves the condition of a user program which is being cyclically executed as it is. Next, the contents of the start address register (ADS) are set in the program counter PC by step 302. By this, the first address of input/output data of an abnormality detection program has been set. In step 303, the pattern memory address ADM is set in the pattern memory register PMR and at the same time the flag SET is also set (step 304).

In step 307 and 312, the CPU 5 reads out and executes all instructions from the address of the user program memory 1 designated by the start address ADS to an address where a FAL instruction is stored at a high speed. As described in the example shown in FIG. 2, all instructions of LDX00, ANDX01, LDX20, ORLD, ANDX30 and FAL01 are executed and the results of execution of those instructions and the status information of each contact point are all memorized in the pattern memory PM. The designation of addresses of the pattern memory PM is performed by the pattern memory register PMR. In other words, a logical abnormality between optional input/output data and the status information of each input/output device related to the input/output data at that time are reproduced and memorized in the pattern memory PM. At this time, it becomes possible to reproduce a logical abnormality, even if it is transitory in nature.

Step 308 is a routine which judges whether the execution of an abnormality detection program has been completed or not. When the execution of each logical operation instruction up to contact point X30 has been completed, the contents temporarily stored in the program counter register PCR by step 313 are set in the program counter PC again, and the execution of the user program which was interrupted midway is resumed.

The routine of step 314 is other OS processing to be properly executed by a user program after a cycle of execution of the user program has been completed. This includes a processing whereby the contents of the pattern memory PM are caused to be displayed on a proper display device, for instance, the display device of the operating unit 6, and reset processing of the abnormality flag FR and the flag SET. The fact that the result of judgement of step 300 is YES means that said processing has not been performed yet in step 314.

It should be noted that as aforementioned it is arranged in this embodiment that said start address ADS and the pattern memory address ADM are fixedly set by the manufacturer. In other words, a user is required to compile a user program so that it is started from these addresses. To avoid this trouble, the controller must be equipped with a switch whereby an address can be optionally set. Upon compilation of a user program, the switch should be fixedly set. Or the controller should be equipped with an appropriate retrieving means whereby the first address of each instruction to be reexecuted is retrieved. By this, a user is able to freely compile a user program. In this embodiment, only one abnormality flag is provided, but plural flag may be provided like the first embodiment and an optional flag may be designated. By these flags, individual subjects of control can be memorized in the pattern memory.

As explained in detail in the foregoing, the programmable controller of the third embodiment is arranged so that when an abnormality flag is set, it retrieves the value of logical operation and logical condition of input/output data of an abnormality detection program and displays such data, therefore the controller allows a user to correctly known abnormalities such as what input/output device became faulty, or by what kind of input condition a sequence abnormality has been caused, etc. As a result of this, an appropriate countermeasure suitable to the contents can be taken and the condition of each abnormality can be monitored by a display device.

Next, FIGS. 11 through 15 show the fourth embodiment of the present invention.

Figure 11:
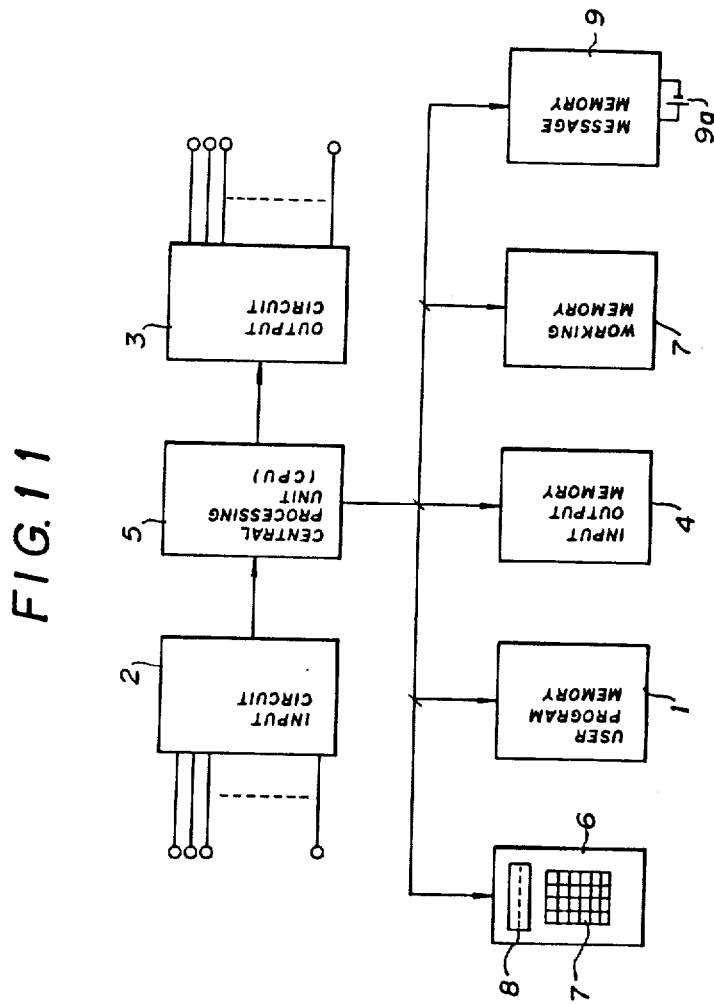
FIG. 11 is a block diagram showing the rough configuration of programmable controller of the third embodiment of the present invention.

As shown in FIG. 11, the programmable controller of the fourth embodiment is composed of the basic configuration shown in FIG. 1 and an additional message memory 9. The messages memory 9 stores message to be set by a user in advance, in response to said plural abnormality detection programs. In other words, in this message memory 9, messages, such as for example shown in FIG. 13, which correspond to all numbers (N=0~M) of said abnormality flags FR (N) are set in advance. The message memory 9 is also equipped with a power source unit 9a for compensating a power failure.

Said operating unit 6 is also equipped with a keyboard 7 which sets required messages in said message memory 9 and a display device 8 which display various messages of the fourth embodiment.

FIG. 12 shows the outline of arrangement of keys of said keyboard 7. The keyboard 7 is equipped with ten keys which prepare a message to be set in the form of character code in said message memory 9, a message key MSG which is used in setting a specified message in the message memory 9, a hold switch key HLD (corresponds to HSW of the second embodiment) which causes said display device 8 to stop repeated display to be described later and to continuously display a message corresponding to the number of a specific abnormality flag, a reset switch key RST which rests each display of the display device 8 and initializes the controller and a group of other keys.

FIG. 13 shows the display pattern of said display device 8. The display device 8 is divided into an upper stage and a lower stage. The upper stage is composed of a fault display unit 8A which displays a message showing the occurrence of a fault "fault occurs", a number of piece display unit 8B which displays a total number of faults occurred in the execution of a cycle of a user program and a number display unit 8C which displays the identification number of a subject of control wherein an abnormality occurs. On the number display unit 8C, a symbol FR showing an abnormality flag and its number N are displayed. Numbers N are automatically and repeatedly displayed in sequence at a fixed interval. The lower stage is a message display unit 8D which displays a message corresponding to said number N. For example, the message display unit 8D displays a message like "conveyor motors are simultaneously turned on" corresponding to an abnormality flag FR01. A displayed pattern on the fault display unit 8A and that of the number of piece display unit 8B are continuously displayed without being changed until they are reset by said reset switch key RST. The number display unit 8C and the message display unit 8D are automatically renewed and displayed at a fixed interval.

FIG. 14 shows flags to be provided in said working memory 7 which are required by the CPU 5 for executing various movements of display control of the fourth embodiment.

The working memory 7 is equipped with M pieces of abnormality flag FR (N), an address counter ADC which performs addressing of abnormality flags from N=0 to N=M every time one cycle of said instruction execution means is executed, which detects an abnormality flag which is in the condition of FR(N)=1, which causes a display control register DCR to store the number N of the abnormality flag which is in the condition of FR(N)=1 from the smallest number to the largest in sequence every time the CPU 5 accepts a periodical interrupt and which causes said number display unit 8C to automatically and repeatedly display those stored numbers in sequence, an error counter ERC which causes said fault display unit 8A, which is set when an abnormality flag that is in condition of FR(N)−1 is detected as a result of said addressing, to display a message "fault exists" and which detects the total number of fault display flags F reset by the operation of said reset switch key RST and flags which are in the condition of FR(N)=1 detected as a result of said addressing and which causes said number of piece display unit 8B to display the total number, a hold flag HF which operates reversely every time said hold switch key HLD is operated, and which performs control whether the display of the number display unit 8C and that of the message display unit 8D should be renewed and displayed or not when the CPU 5 accepts a periodical interrupt, a messages memorizing unit WDM which stores message to be displayed on the display unit 8D corresponding to the number of an abnormality flag displayed on the number display unit 8C (in this embodiment, a memory area of 16 words is provided), and a transfer word counter TWC which designates an address of said message memory 9 wherein messages to be displayed on the message display unit 8D in response to the number of an abnormality flag displayed on the number display unit 8C every time the CPU 5 accepts a periodical interrupt are stored, and which performs addressing thereof and transfers character codes of 16 words to said message memorizing unit WDM respectively.

FIGS. 15(a) and (b) are flowcharts showing the outline of a system program to be executed by the CPU 5 with an emphasis placed on the control movements of the fourth embodiment. More specifically, and FIG. 15(a) shows abnormality detection movements in the course of a cyclical execution of a user program, and FIG. 15(b) shows display control movements for automatically renewing the number N of an abnormality flag FR(N) on the number display unit 8C and shows a message corresponding to the number N on the message display unit 8D, by a periodical interrupt, displaying those numbers and messages repeatedly.

The same symbols are given to those portions which are the same as those of the second embodiment [(FIG. 8(a) (b)] and their explanations are omitted.

Figure 15:
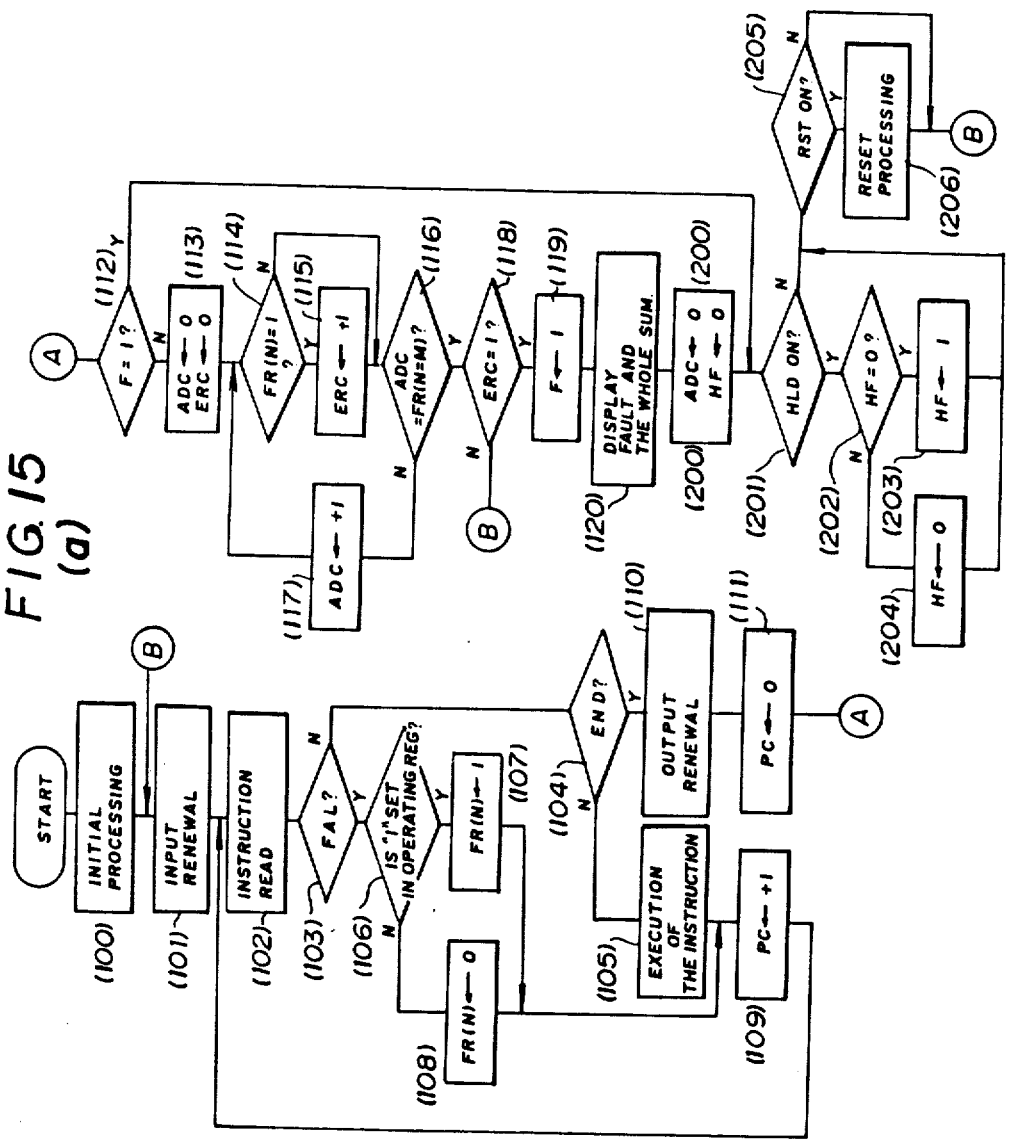
Figure 15B:
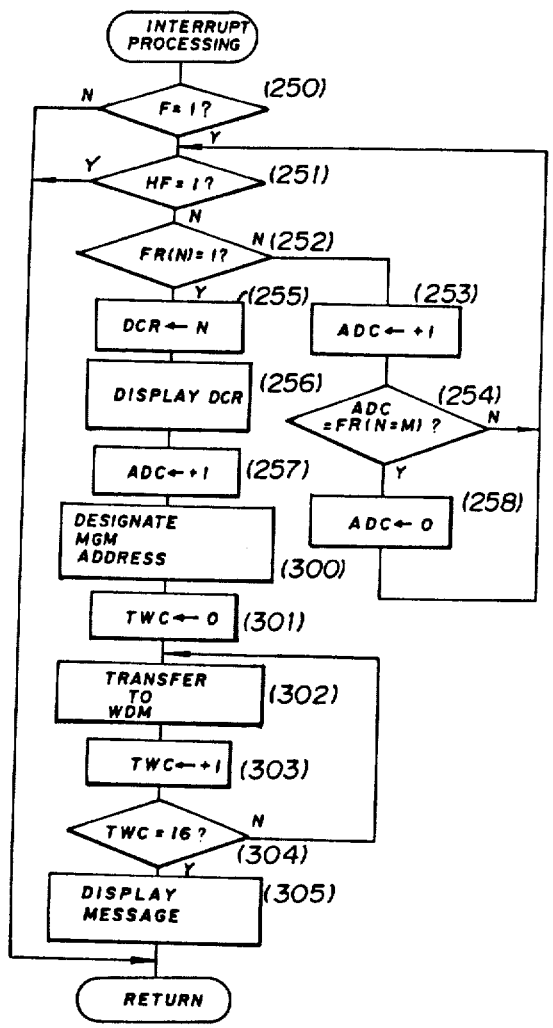

In FIG. 15(b), when the CPU 5 accepts one of the periodical interrupts, the routines of step 250 through step 257 are executed as explained in the second embodiment.

Next, step 300 designates an address of the message memory (MGM) 9 where a message corresponding to the number is stored and step 301 resets the transfer word counter TWC. The routines of steps 302, 303, 304 and 305 update the transfer word counter TWC and transfer each word of a message composed of character codes to the message memorizing unit WDM up to 16 words. The specified message transferred to the message memorizing unit WDM is displayed on the message display unit 8D by step 305, and the CPU 5 returns to the point of the program before the acceptance of the interrupt.

When the CPU 5 accepts the next interrupt and it is found that HF=1 by step 251 as aforementioned, a number and a message corresponding thereto displayed on the number display unit 8C and the message display unit 8D are not renewed. If HF=0, a number which is larger next to the previously displayed abnormality flag is detected and displayed on the number display unit 8C. Then a specified message is displayed on the message display unit 8D by the routines of step 300 through step 305.

As stated above, every time the CPU 5 accepts a periodical interrupt numbers of abnormality flags FR(N) are automatically renewed and displayed on the number display unit 8C and those numbers are repeatedly displayed in sequence from the smallest to the largest ones. A message corresponding to the number of abnormality flag FR(N) displayed on the message display unit 8D is automatically renewed and repeatedly displayed. By the operation of the hold switch key HLD, the automatic renewal of a number displayed on the number display unit 8C and a message displayed on the message display unit 8D is stopped and the same number and the same message corresponding thereto are continuously displayed.

As explained in detail in the foregoing, the fourth embodiment is arranged so that when a set flag of the abnormality flag is detected, a message corresponding to the number of the abnormality flag which is set by a user in advance is displayed, therefore when an abnormality occurs, the kind of the subject of control and a countermeasure to be taken for the abnormality, etc. are displayed in the form of the message. As a result of this, the user is able to easily make a decision, take necessary actions and carry out effective countermeasures for processing abnormalities without requiring such troublesome work as referring to program lists.

Lastly, FIG. 16 through FIG. 20 show the programmable controller of the fifth embodiment of the present invention.

Figures 16, 17:
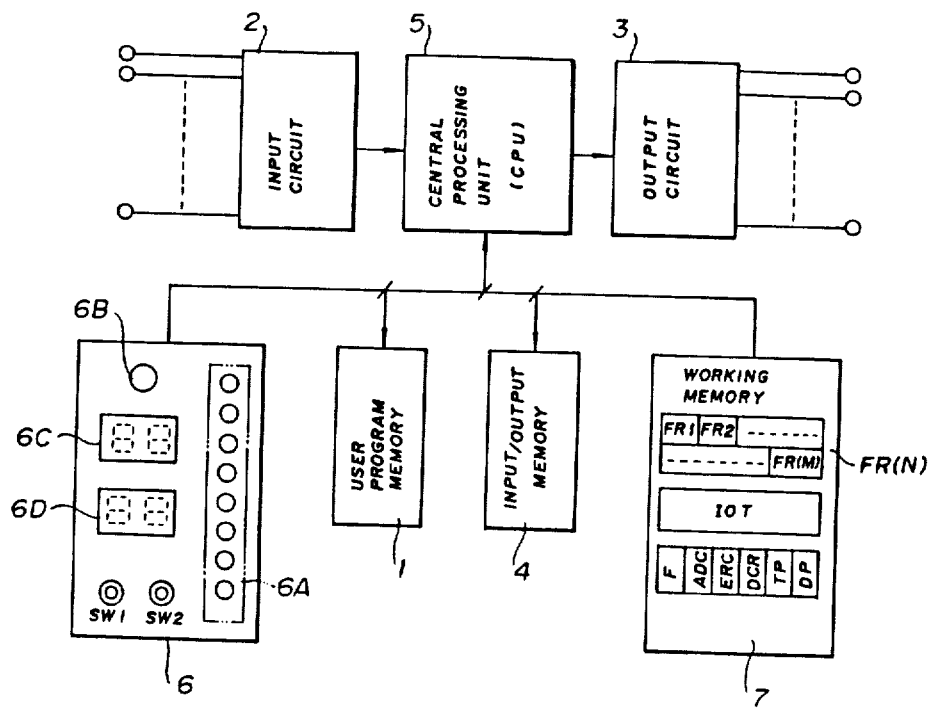
FIG. 16 is a schematic diagram showing the rough configuration of the programmable controller of the fifth embodiment of the present invention.
FIG. 17 is a schematic diagram showing the configuration of an input/output table IOT of the present invention which is prepared in accordance with the abnormality detection program shown in FIG. 2.

In FIG. 16, the programmable controller of the fifth embodiment is equipped with the basic components described in the first embodiment and the following components:

Namely, the operating unit 6 is equipped with a data display device 6A (it is composed of 8 pieces of light emitting diode LED in this embodiment) which displays the logical condition of input/output data of an abnormality detection program.

The working memory 7 is equipped with an input/output table IOT and a pointer (TP,DP) related thereto.

Said input/output table IOT is prepared by retrieving an abnormality detection program related to said each abnormality flag set in said user program memory 1 as an initial processing prior to the execution of a user program and it is a flag number input & output number reference table which corresponds to the flag number N of each abnormality flag FR(N) to the input/output number of input/output data used in an abnormality detection program.

Figure 18:
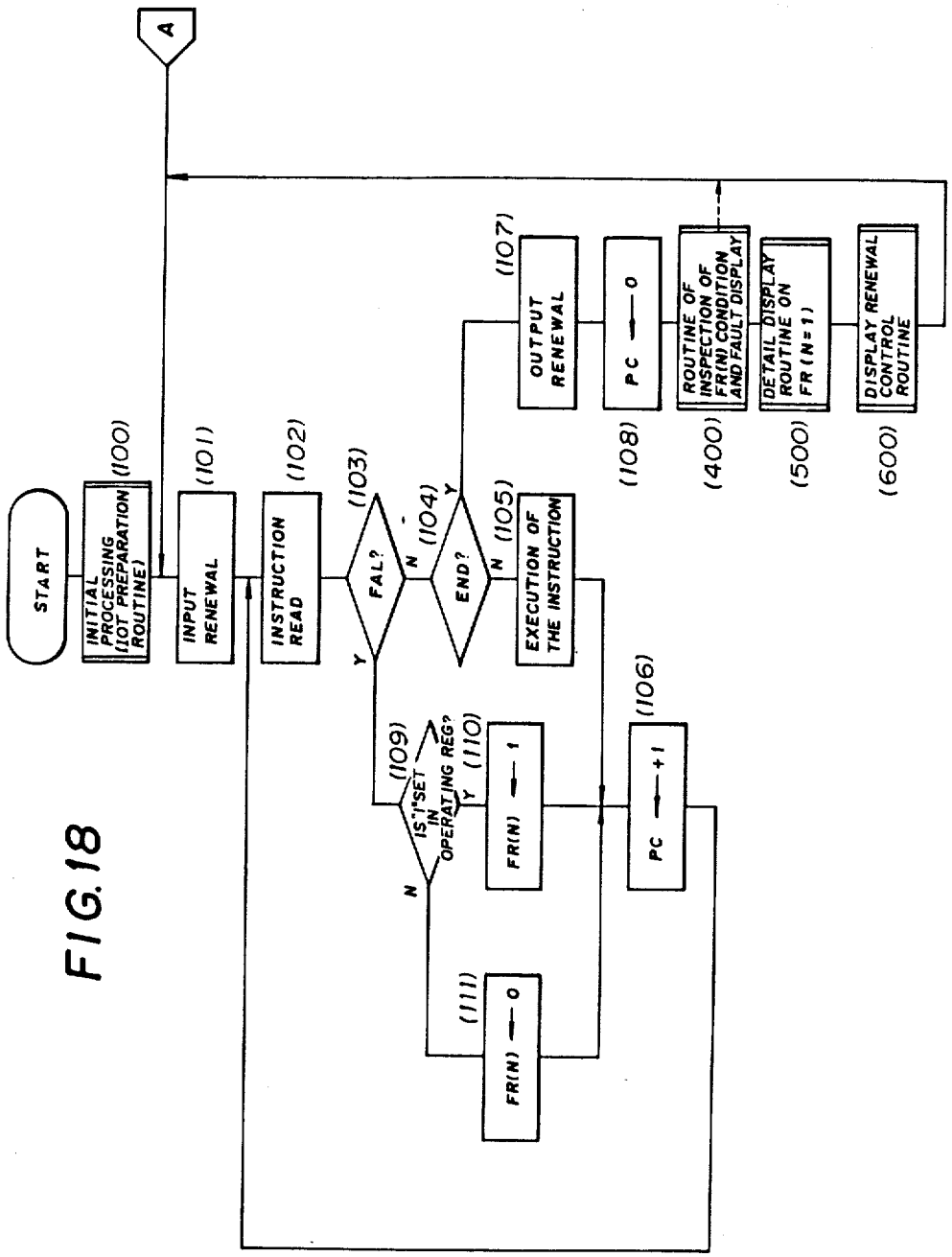
FIG. 18 is a flowchart showing primarily the portion of the fifth embodiment of the present invention of those control movements of said programmable controller.
Figure 19:
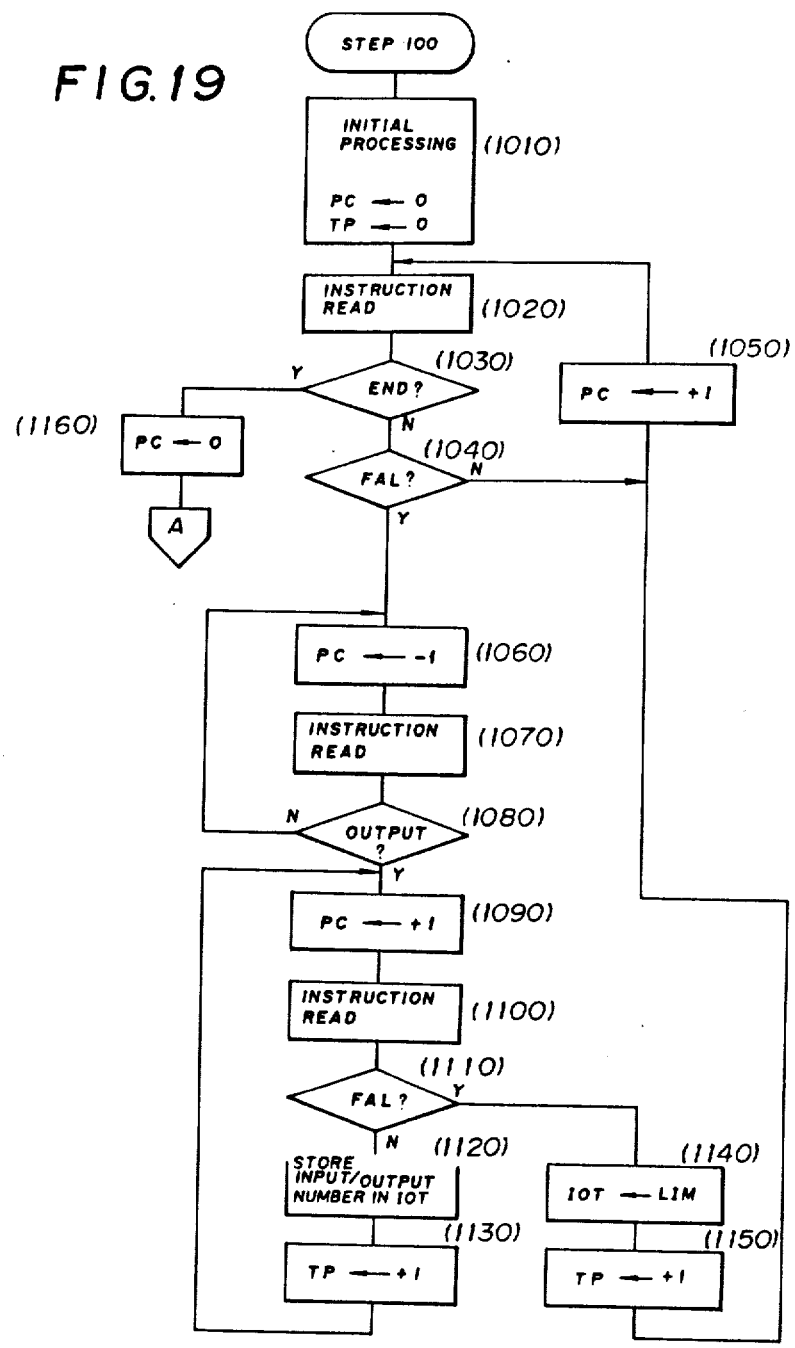
FIG. 19 is a detailed flowchart showing the preparation routine of an input/output table.
Figure 20:
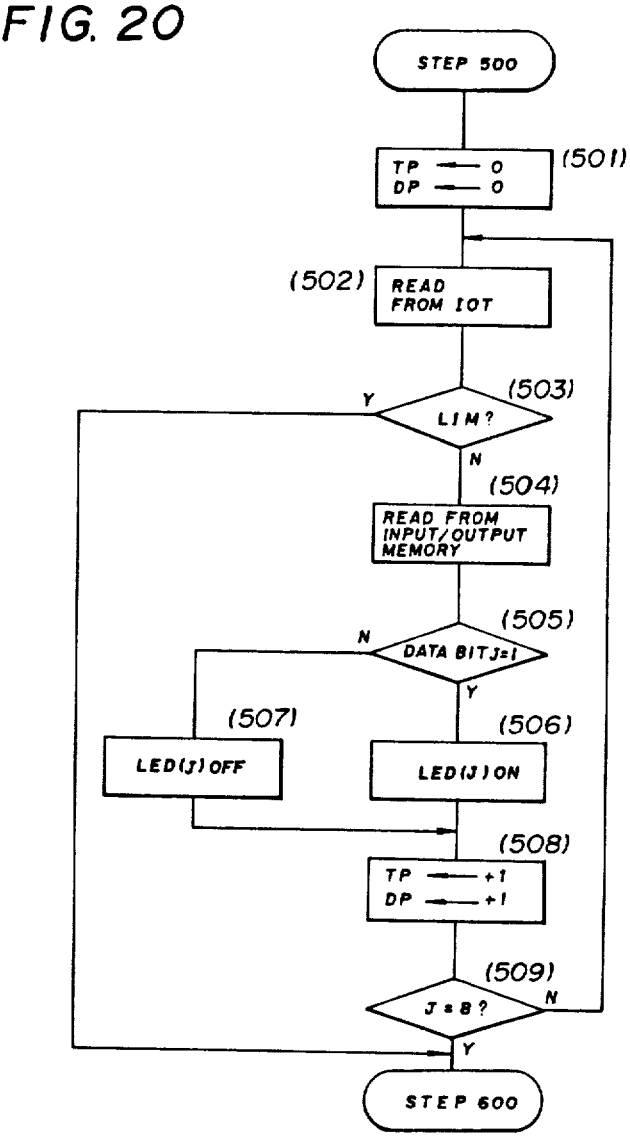
FIG. 20 is a flowchart showing a detailed display routine about abnormality flags which are set.

FIG. 18 is flowchart showing a system program to be executed by the CPU 5 with an emphasis placed on the display control movements of the fifth embodiment. The details of each unit are shown in FIG. 19 and FIG. 20. In the following, the control movements of the CPU 5 will be explained in accordance with flowcharts shown in FIGS. 18-20.

Since the basic movements of a programmable controller have been described in the foregoing, the portion of control movements related specifically to the fifth embodiment with be explained hereinafter.

In FIG. 18, the programmable controller of the fifth embodiment prepares said input/output table IOT in addition to initial processing previously described in step 100. Then the routines of step 400 through 600 are executed after a cycle of a user program has been executed.

At first, the preparation routine of input/output table (IOT) by step 100 is explained. The details of the routine are shown in FIG. 19. For example, the input/output table as shown in FIG. 17 is prepared. The table shown in FIG. 17 has been prepared based on the abnormality detection program shown in FIG. 2 by the following procedures:

If a user instruction read out from the user program memory 1 is a FAL instruction, the routine retrieves the first input/output number of input/output numbers related to the FAL instruction. For example, if FAL 90 is detected, the routine goes backward as input/output number X42, X41 and X40 and so on while reducing the program counter. When OUT 10 is detected, it is known that the first one of the input/output numbers related to FAL 90 is X40, therefore the program counter is advanced by one. Here, a user instruction related to X40 is newly read out from the user program memory 1. This input/output No. X40 is stored in the first address in the corresponding area of the input/output table IOT provided in response to the FAL 90. At this time, the table pointer TP is set. After that, user instructions related to input/output numbers X41 and X42 are read out from the user program memory 1 by advancing the program counter. At the same time, input/output numbers X41 and X42 are stored following said first address by advancing the table pointer TP. Next, FAL 90 is detected and by this, it is known that input/output numbers related to FAL 90 are stored in the specified area of the input/output table IOT. This is shown by the writing of a limiter LIM which is an end code, next to X40.

The above movements are performed for each of all the FAL instructions stored in the user program memory. As a result of this, an input/output table IOT which correlates FAL instructions with input/output numbers is prepared as shown in FIG. 17.

Next, an input/output table preparation routine is explained in accordance with FIG. 19.

In FIG. 19, upon receipt of power supply, well known initial processing is performed in step 1010. In other words, the program counter PC and the table pointer TP are reset. In step 1020, one of the user instructions is red out from the top address of the user program memory 1. Step 1030 judges whether the read out user instruction is an END instruction or not. If the result of judgement is NO, the routine advances to step 1040. If it is YES, the program counter PC is reset by step 1160 and the routine advances to step 101. Step 1040 judges whether the read out user instruction is a FAL instruction or not. If the result of judgement is NO, step 1050 advances the program counter PC and the routine returns to step 1020. If the result of judgement is YES, the routine advances to step 106. In step 1060, the program counter PC is reduced. In step 1070, one of the user instructions is read out from the user program memory 1. Step 1080 judges whether the read out user instruction is an output instruction or not. If it is not an output instruction, the routine returns to step 1060. If it is an output instruction, the program counter is advanced by step 1090. In step 1100, one of the user instructions is read out from the user program memory 1. Step 1110 judges whether the read out user instruction is a FAL instruction or not. If the result of judgement is not a FAL instruction, input/output numbers are stored in the input/output table IOT by step 1120. Also the table pointer TP is advanced by step 1130. If the result of judgement is a FAL instruction, in step 1140, a limiter LIM which is an end code is written down in the input/output table IOT and the table pointer TP is advanced by step 1150.

Then the routine advances to step 101 of the main routine shown in FIG. 18 and a cycle of the user program is executed.

Step 400 is a routine which inspects the condition of each abnormality flag FR(N) operated by said FAL instruction and causes the operating unit 6 to perform a specified display. This routine detects such flags that are set among all abnormality flags and their total number and the smallest number of those set flag numbers. By this operation, specified data are displayed on the fault display device 6B, the number of piece display device 6C and the number display device 6D. In other words, in step 400, the routines of step 112 through step 124 of the first embodiment (FIG. 5) are executed.

Next, the routine of step 500 checks the input/output table IOT prepared by step 100 based on the number displayed on the number display device 6D by step 400. By this operation, input/output data corresponding to each input/output number are read out from the input/output memory 4 and according to the logical condition of these input/output data, each LED on the data display device 6A is caused to light or go out. FIG. 20 shows the details of the routine.

In FIG. 20, the first step 501 resets the table pointer TP and the data pointer DP. The data pointer DP is a device which performs addressing of all LEDs of the data display device 6A from J=1 to J=8. The next step 502 reads out one input/output number from an area (designated by the table pointer) of the input/output table IOT corresponding to the flag number of the abnormality flag FR(N) displayed on the number display device 6D. Step 503 checks whether the data read out from the input/output table IOT is a limiter LIM or not. If the result of judgement is YES, the routine proceeds to step 600, and if it is NO, the routine proceeds to step 504. Step 504 is a routine which reads out input/output data corresponding to the input/output number read out from the input/output table IOT of the input/output memory 4. Step 505 inspects the logical condition of the read out input/output data. If the result of judgement is YES, step 506 causes an LED designated by the data pointer to light. If the result of judgement is NO, step 507 causes the LED to go out. Then step 508 causes the table pointer TP and data pointer DP to advance. The next step 509 judges whether all LEDs are accessed or not. Depending on whether the result of judgement is YES or NO, the routine is branched to step 600 and step 502.

The last step 600 is a routine of display renewal control whereby the contents of the number display device 6D and the data display device 6A by the advance operation of the advance switch SW 1 provided on the operating unit 6 are displayed. Like the first embodiment, when the advance switch SW 1 is operated, of those abnormality flags which are set, a number which is larger next to the flag number displayed on the number display device 6D is detected and displayed on the number display device 6D (step 127~130). Also data display related to the fifth embodiment is performed. Namely, the routine of step 500 reads out input/output data corresponding to the flag number displayed on the number display device 6D from input/output memory 4. This is displayed on the data display device 6A. The above movements are performed every time advance is made. When display control for all of the set abnormality flags FR(N) is completed, the routine returns to step 101 of the main routine. Like the first embodiment, the reset switch SW 2 is used to reset display devices 6A, 6B, 6C and 6D.

Like the first embodiment, in this fifth embodiment, the operating unit is equipped with the number-of-piece display device and the number display device, but this invention is not limited to such a system. For example, it is possible to use one display device which can be changed over to display the number of faults generated or to display a flag number. At this time, it may be arranged so that the display of input/output data is renewed together with the display of a flag number.

As explained in detail in the foregoing, the programmable controller of the fifth embodiment is equipped with and input/output table which is capable of correlating the flag number of an abnormality flag to the input/output number of input/output data used in an abnormality detection program related to the flag, and displaying the logical condition of the input/output data corresponding to the flag number, therefore the user is able to easily know the contents of abnormalities in detail such as what input/output device becomes faulty, or by what input condition a sequence abnormality occurs, etc.

As many apparently widely different embodiments of the present invention may be made without departing from the spirit and scope thereof, it is to be understood that the invention is not limited to the specific embodiments thereof except as defined in the appended claims.

What is claimed is:

1. A programmable controller comprising:
   a user program memory for storing user programs including an abnormality detection program;
   an input circuit for receiving input data;
   an output circuit for sending out output data;
   an input/output memory for storing input/output data corresponding to said input data received by said input circuit and said output data sent out by said output circuit;
   a central processing unit, including:
   (a) instruction execution means wherein instruction of said user programs stored in said user program memory are executed in sequence at high speed and wherein operational processing is carried out in accordance with said input/output data stored in said input/output memory,
   (b) input renewal means for writing said input data of said input circuit in a predetermined area of said input/output memory, and
   (c) output renewal means for setting said output data of said input/output memory in said output circuit;
   working memory means operatively coupled to said central processing unit; and
   operating unit means, including:
   (i) display control means for controlling the display of abnormality information detected during the execution of said abnormality detection program by said central processing unit, and
   (ii) display means for displaying said detected abnormality information in accordance with said display control means;
   said working memory including abnormality flags, an address counter which detects a flag condition and addresses each of the abnormality flags each time a cycle of said user program is executed by said instruction execution means, a fault display flag which is set when an abnormality flag is detected and which is reset by a reset switch, and a display control register for storing the number of each abnormality flag and for causing said display control means to issue commands to said display means for displaying and storing the number and address of each of said detected abnormality flags in sequence each time an advance operation is called for by an advance switch, thereby displaying the numbers of the abnormality flags.

2. A programmable controller as claimed in claim 1, wherein said working means further comprises an error counter for counting a total number of detected abnormality flags and which causes said display control means to issue commands to said display means for displaying said total number.

3. The programmable controller of claim 1 wherein said working memory means includes a means for detecting the condition of input/output data related to said abnormality detection program when said abnormality flag is set; and said display control means issues signals to said display means for displaying the condition of input/output data detected by said working memory means.

4. The programmable controller of claim 1 wherein said display control means includes a message memory for storing messages, set by a user in advance, which respectively correspond to ones of said abnormality flags; and a means for reading out said messages respectively corresponding to said ones of abnormality flags detected by said working memory means from said message memory and displaying the message on said display means.

5. The programmable controller of claim 1 wherein said working memory means includes a means, as an initial processing prior to the execution of a user program, for processing an abnormality detection program related to each of said abnormality flags set in said user program memory and for preparing a flag number input-output number reference table which correlates the flag number of each abnormality flag to the input/output number of input/output data used in the abnormality detection program in a specified memory unit, and said display control means includes a means for obtaining an input/output number corresponding to the flag number of said abnormality flag which is set by the execution of a user program by referring to said reference table, reading out input/output data of the corresponding input/output number from the input/output memory and displaying the data on said display means.

6. The programmable controller of claim 5 characterized in that said flag number/input-output number reference table preparation means includes a means for retrieving the first address of said input/output data by retroactive operation.

* * * * *